United States Patent
Kameyama

(10) Patent No.: US 6,597,870 B2
(45) Date of Patent: Jul. 22, 2003

(54) LENS-FITTED PHOTO FILM UNIT HAVING A STOP CHANGING DEVICE

(75) Inventor: Nobuyuki Kameyama, Minami-Ashigara (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 0 days.

(21) Appl. No.: 10/161,677

(22) Filed: Jun. 5, 2002

(65) Prior Publication Data

US 2002/0181958 A1 Dec. 5, 2002

(30) Foreign Application Priority Data

Jun. 5, 2001 (JP) ........................................ 2001-169293

(51) Int. Cl.[7] .............................. G03B 9/02; G03B 9/04; G03B 15/03
(52) U.S. Cl. ........................ 396/179; 396/459; 396/505
(58) Field of Search ................................ 396/179, 458, 396/459, 505, 6

(56) References Cited

U.S. PATENT DOCUMENTS 6,442,343 B2 * 8/2002 Kameyama et al. ........ 396/179
6,493,513 B1 * 12/2002 Noguchi et al. ............ 396/458

* cited by examiner

Primary Examiner—Christopher Mahoney
(74) Attorney, Agent, or Firm—Young & Thompson

(57) ABSTRACT

A taking lens is held by a lens-holding rib, behind which an opening is formed as an aperture-stop. A stop plate is disposed behind the taking lens and is formed with a stop aperture, which is smaller than the aperture-stop. The lens-holding rib is formed with a cut portion through which an end portion of the stop plate is inserted to position the stop aperture at a photographic optical axis. Upon sliding a switch member upward, a setting segment thereof pushes up an abutting pin integrally formed with the stop plate so that the stop plate is rotated to move toward the outside of the lens-holding rib through the cut portion. Hence, the stop aperture of the stop plate is evacuated from the photographic optical axis.

15 Claims, 5 Drawing Sheets

LENS-FITTED PHOTO FILM UNIT HAVING A STOP CHANGING DEVICE

BACKGROUND OF THE INVENTION

1. Field of the Invention

The present invention relates to a lens-fitted photo film unit, and more particularly to a lens-fitted photo film unit having a stop changing device.

2. Description of the Related Art

Various types of lens-fitted photo film units are manufactured and are on the market. The lens-fitted photo film unit has a simple photographing mechanism and is loaded with a photographic film at the time of manufacturing. In the lens-fitted photo film unit, a stop and a flash-light amount are fixed for the purpose of simplifying its structure and reducing its cost. Due to this, it is caused to narrow a range of a photographic condition for properly taking a main subject and the background thereof. When subject brightness and main-subject distance are out of the range of the photographic conditions, photographic image quality deteriorates.

In order to solve the above problem, it is considered to incorporate a stop changing device into the lens-fitted photo film unit. This stop changing device switches a larger stop and a smaller stop in two steps to simply perform exposure adjustment. Such a stop changing device comprises a stop plate formed with a smaller-stop aperture. When the subject brightness is high, the stop plate is positioned at a photographic optical path to set the smaller stop. When the subject brightness is low, the stop plate is evacuated from the photographic optical path to set the larger stop.

As to mechanisms for moving the stop plate of the stop changing device, there are some types of system, for example, a subject-brightness measuring system and a flash interlocking system. In the subject-brightness measuring system, a solenoid is driven in accordance with a photometry value to move the stop plate. In the flash interlocking system, the stop plate is moved in association with an operation for sliding a flash switch. The stop changing device of the subject-brightness measuring system drives the solenoid so as to move the stop plate in accordance with a detection value of the subject brightness obtained from a light receiving element. The smaller stop is set in the case of high subject brightness and the larger stop is set in the case of low subject brightness. Meanwhile, in the stop changing device of the flash interlocking system, the stop plate is positioned so as to be associated with the flash switch. When the flash switch is turned off to take a picture without the flash light, the smaller stop is set. When the flash switch is turned on to take a picture with the flash light, the larger stop is set.

In the meantime, the lens-fitted photo film unit has a extremely simple structure regarding a taking lens, on account of reducing the cost. In general, the taking lens is constituted of one or two lenses. Recently, the taking lens having a structure of two groups and two lenses is used in view of an advantage in correcting an aberration. The taking lens of such a structure is held by a lens holder, which has a cylindrical shape and is disposed in front of a fixed aperture-stop. When this kind of the taking lens is combined with the foregoing stop changing device, the stop plate formed with the smaller stop aperture is inserted between the two lenses to position the smaller stop aperture at a front side of the aperture-stop.

It is required for the lens-fitted photo film unit to further reduce the cost. In view of this, it is considered to combine the stop changing device not only with the taking lens of the above structure but also with the taking lens of a single-lens structure. By decreasing a number of parts, the cost may be further lowered.

However, it is difficult to correct the aberration when the taking lens has the single-lens structure. As a stop diameter becomes large, the aberration further increases. Therefore, the image quality is likely to deteriorate at the time of the larger stop. In the above-described stop changing device, the larger stop is set when the subject brightness is low. If this stop changing device is combined with the taking lens of the single-lens structure, the image quality is likely to further deteriorate at the time of the larger stop. Because, lowness of the lens performance concurs with the low subject brightness.

SUMMARY OF THE INVENTION

In view of the foregoing, it is a primary object of the present invention to provide a lens-fitted photo film unit in which a stop changing device is combined with a taking lens having a single-lens structure.

It is a second object of the present invention to provide a lens-fitted photo film unit which is simplified whereas a stop changing device is combined with a taking lens having a single-lens structure.

It is a third object of the present invention to provide a lens-fitted photo film unit in which its cost is reduced whereas a stop changing device is combined with a taking lens having a single-lens structure.

In order to achieve the above and other objects, the lens-fitted photo film unit according to the present invention comprises a taking lens of a single lens, a lens base for holding the taking lens, and a stop changing device for moving a stop plate disposed behind the taking lens. The stop plate is formed with a stop aperture and is movable perpendicularly to a photographic optical axis.

The stop changing device moves the stop plate to change a stop of the lens-fitted photo film unit. The stop plate is moved between a smaller-stop position where the stop aperture of the stop plate is positioned at a photographic optical axis, and a larger-stop position where the stop aperture is evacuated from the photographic optical axis.

The lens base is provided with a concave into which the stop plate is inserted. The concave is formed inside a lens-holding rib integrally formed with the lens base. When the stop aperture of the stop plate is set to the smaller-stop position, the stop plate enters the concave. When the stop aperture is moved from the smaller-stop position to the larger-stop position, the stop plate is evacuated from the concave.

According to the present invention, by using the photographic film of high sensitivity, it is possible to properly perform the exposure at a low-brightness range. Moreover, in the case of high brightness, the stop is changed to the smaller stop so that high image-quality may be obtained. Although the taking lens of the single-lens structure is used, it is possible to obtain image quality corresponding to a taking lens of two-lens structure. A number of parts may be reduced and the construction is simplified to lower the cost.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
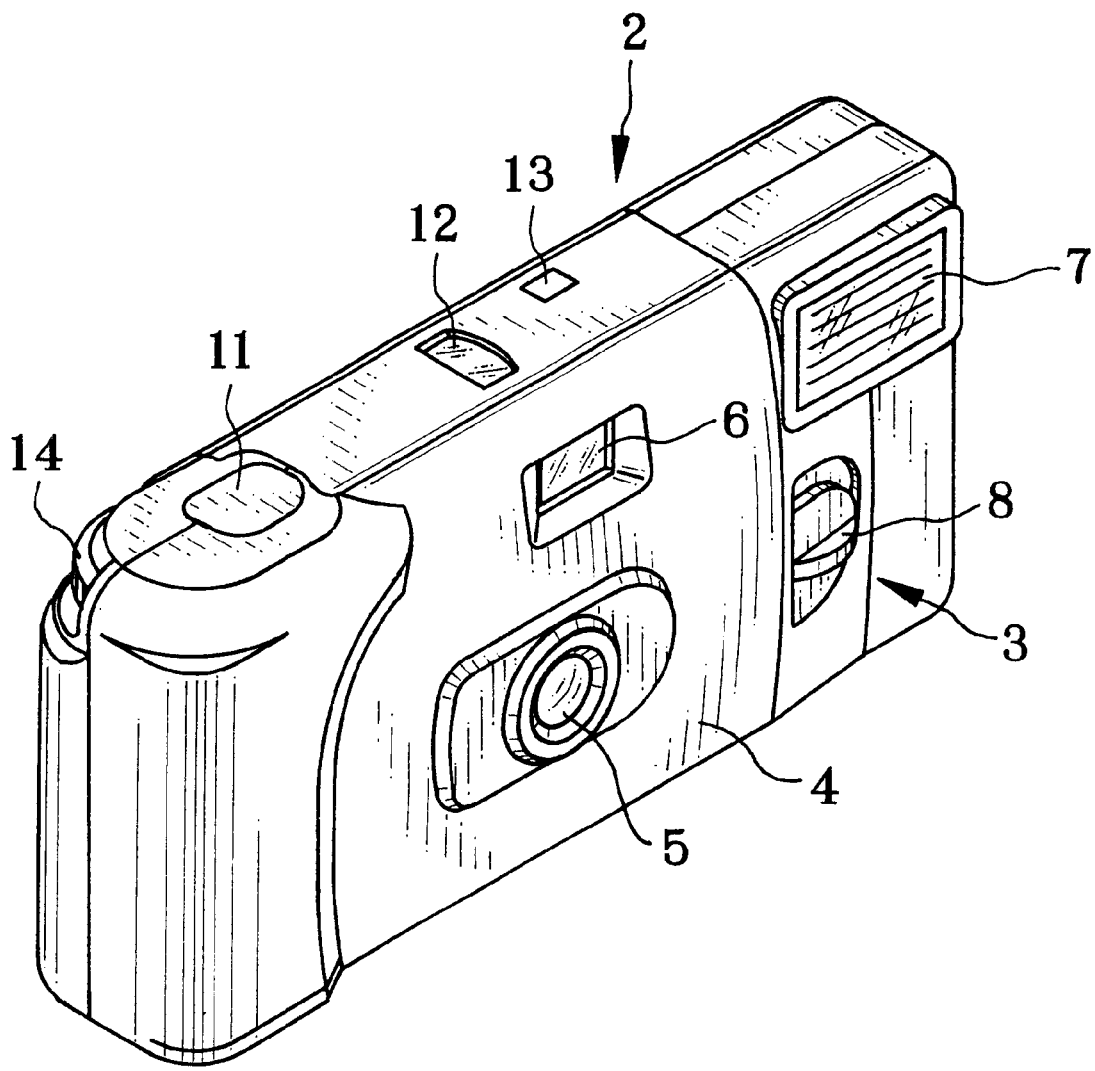
FIG. 1 is a perspective view showing a lens-fitted photo film unit.

FIG. 1 is a front perspective view showing a lens-fitted photo film unit 2 according to the present invention. The lens-fitted photo film unit 2 is constituted of a unit body 3 and a label sheet 4. The unit body 3 includes various photographing mechanisms and the label sheet 4 partially covers the exterior of the unit body 3. A front face of the unit body 3 is provided with a taking lens 5, a viewfinder 6 of a subject side, a flash portion 7, a flash switch 8, a photometry device, and so forth. A top face of the unit body 3 is provided with a release button 11, a counter window 12 for indicating a residual number of photographable frames, and a light guide 13 for indicating flash charging. Further, a rear side of the unit body 3 is provided with a take-up wheel 14, the viewfinder of an eyepiece side, and so forth.

Figure 2:
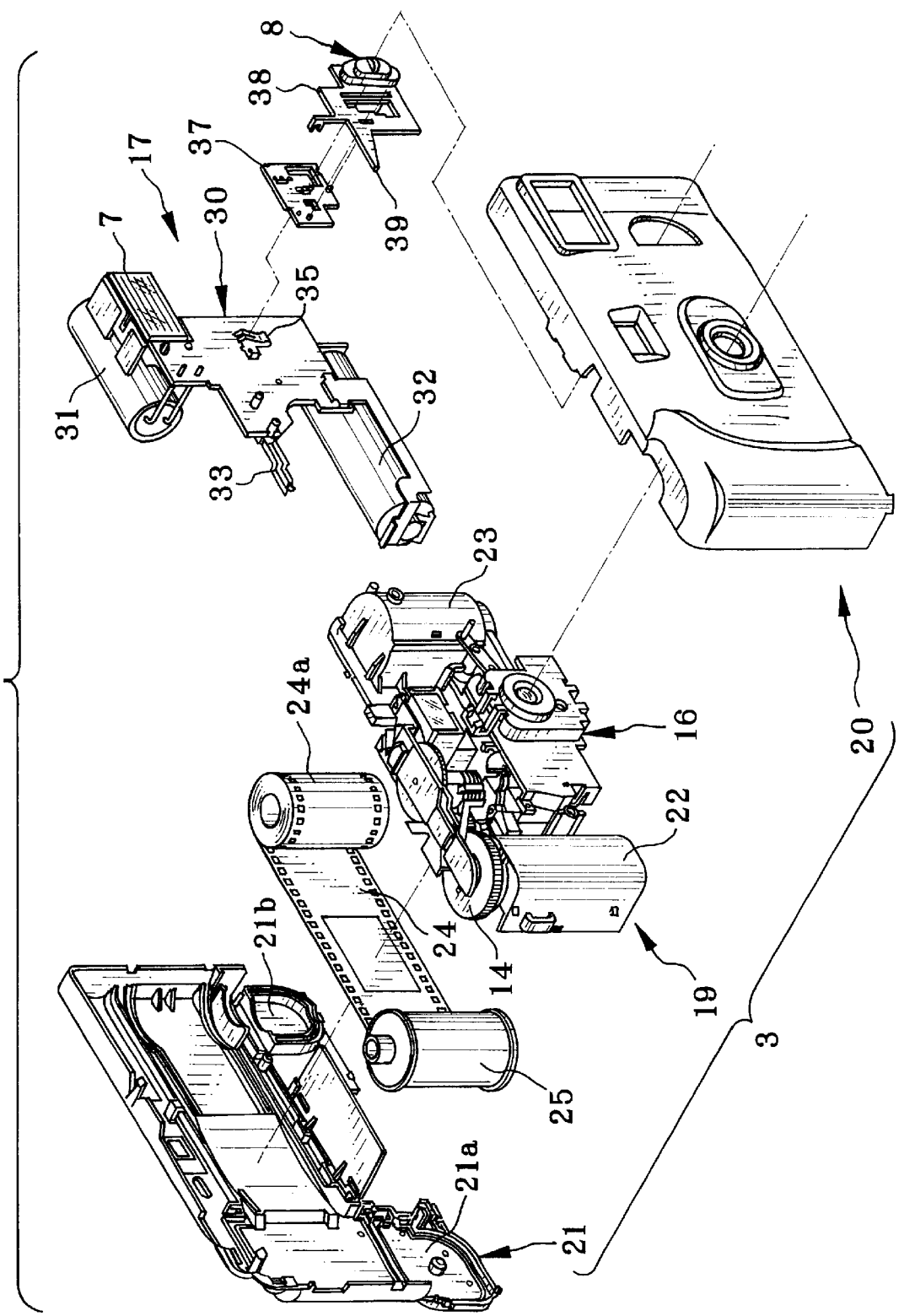
FIG. 2 is an exploded perspective view showing the lens-fitted photo film unit.

As shown in FIG. 2, the unit body 3 is constituted of a unit base 19, a front cover 20, and a rear cover 21. The unit base 19 includes an exposure unit 16, a flash unit 17, and so forth. The front cover 20 and the rear cover 21 are attached to the unit base 19 so as to cover the front and the back thereof. The front cover 20 is formed with openings for exposing the taking lens 5, the viewfinder 6, the flash portion 7, the flash switch 8, and so forth.

The rear cover 21 covers the back of the unit base 19, and forms a film passage therewith. The film passage extends from a film-roll chamber 23 to a cartridge chamber 22 through a rear side of an exposure aperture. Through the film passage, a photographic film 24 is taken up from the film-roll chamber 23 into a film cartridge 25 contained in the cartridge chamber 22.

The rear cover 21 is provided with bottom lids 21a and 21b formed on the bottom thereof, by which the bottoms of the cartridge chamber 22 and the film-roll chamber 23 are light-tightly closed. The bottom lid 21a of the cartridge chamber 22 is openable and is also used for drawing out the film cartridge 25 in which all of the exposed photographic film 24 has been taken up. Incidentally, in the present embodiment, an ultrahigh-speed photographic film having ISO sensitivity of 1600 is used as the photographic film 24 to be loaded in the lens-fitted photo film unit 2.

The unit base 19 is integrally formed with the cartridge chamber 22 and the film-roll chamber 23, which are located at left and right sides of the unit base 19 and between which the exposure unit 16 is disposed. Moreover, between the exposure unit 16 and the film-roll chamber 23, is attached the flash unit 17 by means of a claw connection. The cartridge chamber 22 and the film-roll chamber 23 are respectively loaded with the film cartridge 25 and a film roll 24a formed by rolling the photographic film 24. The take-up wheel 14 is rotatably attached to an upper portion of the cartridge chamber 22. A shaft integrally formed with a lower portion of the cartridge chamber 22 engages with a spool of the film cartridge 25 contained in the cartridge chamber 22. Upon rotating the take-up wheel 14 in a counterclockwise direction in the drawing, the exposed photographic film 24 is taken up into the film cartridge 25.

The flash unit 17 is unified such that a main capacitor 31, a battery 32, a synchro switch 33, a charging switch 35, and so forth are attached to a circuit board 30. Various electronic parts are attached to the circuit board 30 to form a flash circuit. The synchro switch 33 is short-circuited by a press segment 36c of a shutter blade 36 (see FIG. 3), which is rotated in association with a release operation of a shutter mechanism, to emit the flash light. The charging switch 35 is turned on and off by a vertical slide operation of the flash switch 8. By the way, in the present invention, a guide number of the flash unit is set to 6.3, which is a lower value in comparison with the flash unit incorporated in the conventional lens-fitted photo film unit. Thus, the employed main capacitor 31 has smaller capacitance so that the cost is decreased.

A switch member 38 and a support member 37 are incorporated between the front cover 20 and the flash unit 17. The front of the switch member 38 is integrally formed with the flash switch 8. The switch member 38 is supported by the support member 37 so as to be slidable between an upper ON-position and a lower OFF-position. A rear face of the switch member 38 is formed with a protrusion (not shown), which turns on the charging switch 35 of the flash unit 17 upon sliding the flash switch 8 to the ON-position. One side of the switch member 38 is integrally formed with a setting segment 39 constituting a stop changing device. Meanwhile, a part of the light guide 13 is adapted to project from the unit body 3 upon sliding the flash switch 8 upward.

The exposure unit 16 is disposed at a central portion of the unit base 19. The exposure unit 16 includes the taking lens 5, a lens base 41, a stop plate 42, a shutter mechanism, a film stopping mechanism, a counter mechanism for indicating the residual number of the photographable frames, the viewfinder, which are unitedly attached to a dark box 44. In front of the dark box 44, the shutter blade 36 and the lens base 41 are attached in this order.

Figure 3:
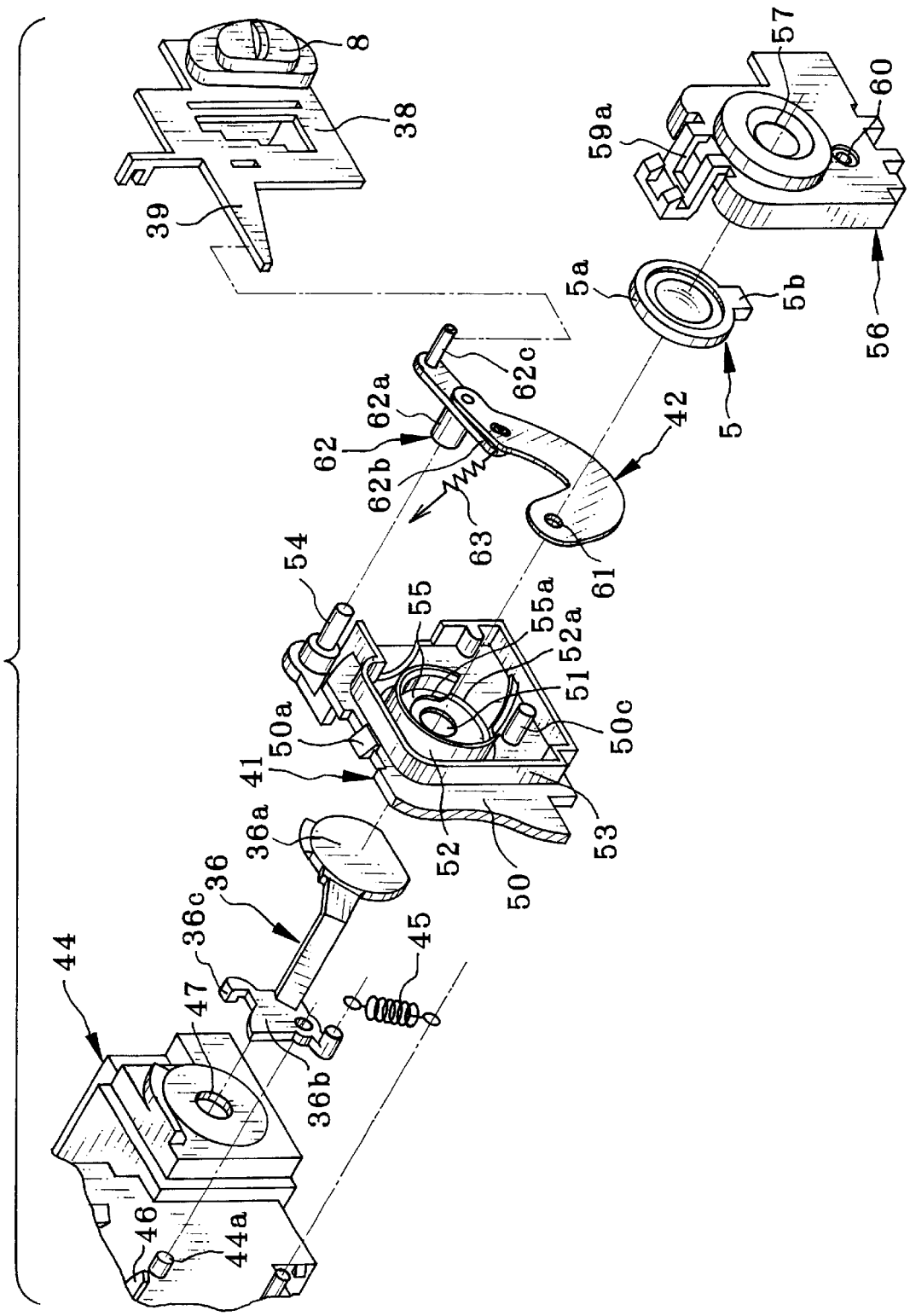
FIG. 3 is an exploded perspective view showing an exposure device.

As shown in FIG. 3, the shutter blade 36 has a structure of a single sector blade and is rotatably attached to a pin 44a formed on the dark box 44. The shutter blade 36 is urged by a spring 45 and is usually kept in a closed position where a blade portion 36a covers a shutter opening 47. When a picture is taken, the end of an attachment portion 36b is kicked by a shutter lever 46 operated in association with the depression of the release button 11 so that the shutter blade 36 is rotated to an open position (in a clockwise direction in the drawing) where the shutter opening 47 is opened. After that, the shutter blade 36 is returned to the closed position by the spring 45. During the rotation of the shutter blade 36, the shutter opening 47 is opened to take a picture. Incidentally, in the present embodiment, a shutter speed for opening the shutter blade 36 is set to $\frac{1}{100}$ seconds. The shutter blade 36 is formed with the press segment 36c for pressing the synchro switch 33 of the flash unit 17. When the shutter blade 36 reaches a full-open position where the shutter blade 36 fully opens the shutter opening 47, the press segment 36c turns on the synchro switch 33.

The lens base 41 is integrally formed with a base plate 50, an opening 51, a lens-receiving rib 55, a lens-holding rib 52, a frame rib 53, and a projection 54 to which a stop lever 62 is rotatably attached. The base plate 50 substantially has a flat shape and covers the front of the dark box 44. The opening 51 is formed at a central portion of the base plate 50 so as to become a stop. The lens-receiving rib 55 has a horseshoe shape to surround three sides of the opening 51. The lens-holding rib 52 has a cylindrical shape, a part of which is cut out. The frame rib 53 substantially has a square shape and is formed so as to surround the lens-receiving rib 55 and the lens-holding rib 52.

Figure 4:
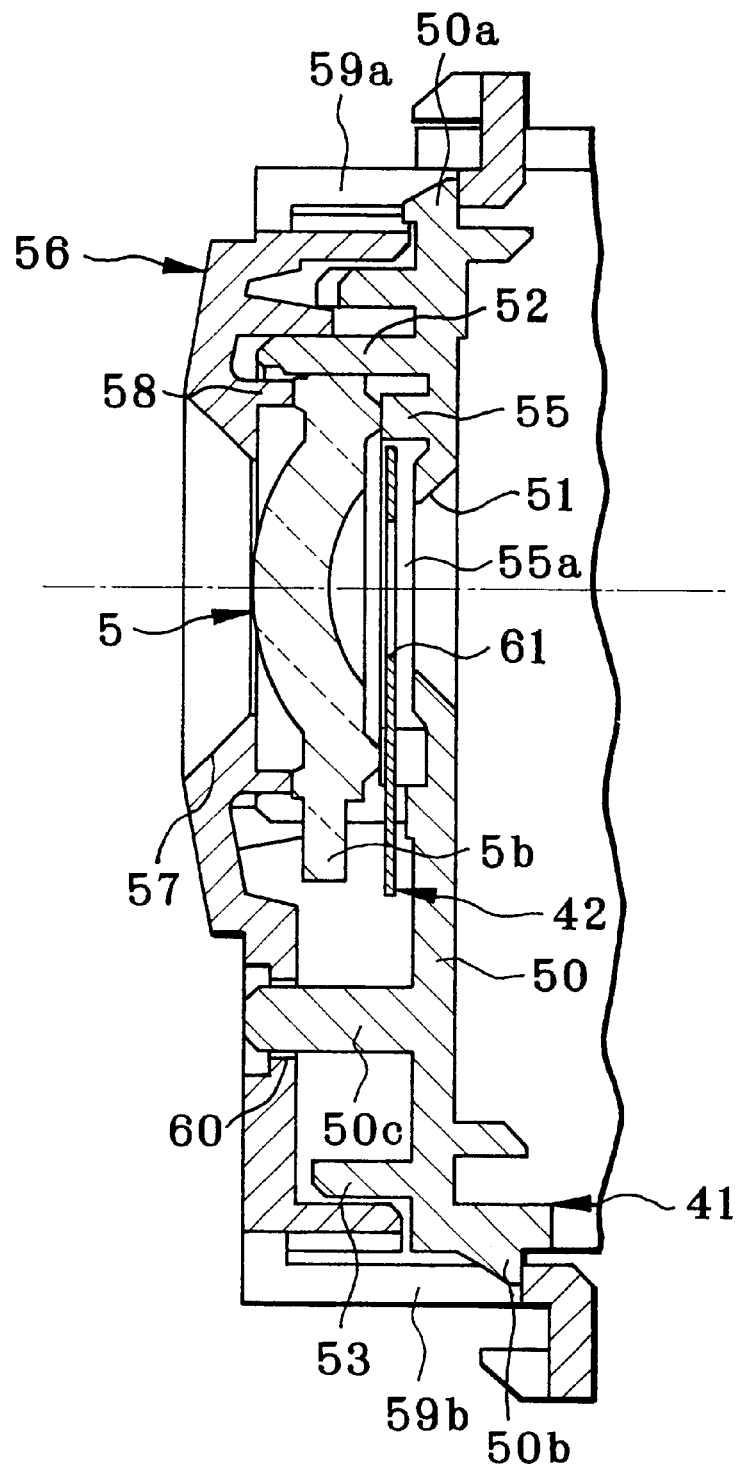
FIG. 4 is a section view partially showing the exposure device.

The inside of the lens-holding rib 52 is integrally formed with the lens-receiving rib 55 having the horseshoe shape. Further, the inside of the lens-receiving rib 55 is formed with a concave 55a into which the stop plate 42 is inserted so as to be rotated perpendicularly to a photographic optical axis. In view of this, the concave 55a has a shape corresponding to an end shape of the stop plate 42. The stop plate 42 is attached so as to be rotatable around the projection 54. The end portion of the stop plate 42 enters the concave 55a provided just behind the taking lens 5 so that the stop is changed. As shown in FIG. 4, the lens-receiving rib 55 abuts on a peripheral surface of an image-forming side of the taking lens 5.

A lens holder 56 is attached to the front side of the lens base 41. As shown in FIG. 4, the lens holder 56 comprises a lens opening 57, an annular rib 58, grooves 59a and 59b, and an engagement hole 60. The lens opening 57 is for exposing the taking lens 5. The annular rib 58 is formed so as to protrude inward and to be larger than the lens opening 57. The grooves 59a and 59b are retained by claws 50a and 50b formed at upper and lower edges of the base plate 50. The engagement hole 60 engages with a pin 50c formed on the base plate 50. A lens holder 56 is disposed at a predetermined position of the lens base 41 by engaging the engagement hole 60 with the pin 50c. The annular rib 58 presses a periphery 5a of the taking lens 5. The taking lens 5 is interposed between the lens holder 56 and the lens base 41. When the claws 50a and 50b engage with the grooves 59a and 59b, a gap is formed between the annular rib 58 and the lens-receiving rib 55. The gap is adapted to be slightly shorter than a thickness of the lens periphery. Owing to this, the lens is prevented from becoming unstable in an optical-axis direction.

The taking lens 5 is provided with a protrusion 5b projecting from the disk-shaped periphery 5a. Although the protrusion 5b is for providing a gate used for molding, the whole protrusion 5b may be formed by cutting as the gate. The protrusion 5b is fitted into a cut portion 52a of the lens-holding rib 52 to prevent the taking lens 5 from rotating. Incidentally, as to the taking lens 5, a lens whose f-number is equal to 9.5 is used.

The stop plate 42 constitutes the stop changing device together with the foregoing setting segment 39. The stop plate 42 is formed in an L-like shape and the end portion thereof is formed with a stop aperture 61, which is smaller than the shutter opening 47 and the opening 51 formed in the lens base 41. The stop plate 42 is unified with a stop lever 62 comprising a shaft member 62a, an attachment portion 62b, and an abutting pin 62c. A spring 63 is attached to the stop lever 62. By means of the spring 63, the stop plate 42 unified with the stop lever 62 is urged in a clockwise direction in the drawing to insert the end portion of the stop plate 42 into the concave 55a of the lens base 41.

As to the stop lever 62, an attachment hole (not shown) formed in the rear side of the shaft member 62a is rotatably attached to the projection 54 formed on the lens base 41. The stop plate 42 is securely fixed to the attachment portion 62b. The abutting pin 62c projects forward rather than the stop plate 42 to abut on the setting segment 39 integrally formed with the switch member 38. When the switch member 38 is set to the OFF-position, the end portion of the stop plate 42 enters the concave 55a of the lens base 41 so that the stop aperture 61 is positioned at the photographic optical axis. In other words, the stop aperture 61 is set to a smaller-stop position. Upon sliding the switch member 38 toward the ON-position, the setting segment 39 pushes up the abutting pin 62c of the stop lever 62 so that the stop plate 42 is rotated against the spring 63 in the counterclockwise direction in the drawing. Thus, the stop plate 42 is evacuated from the photographic optical axis. In other words, the stop plate 42 is set to a larger-stop position. In the present embodiment, the f-number is set to 17 when keeping the stop plate 42 in the smaller-stop position, and is set to 9.5 when keeping the stop plate 42 in the larger-stop position.

Figure 5A:
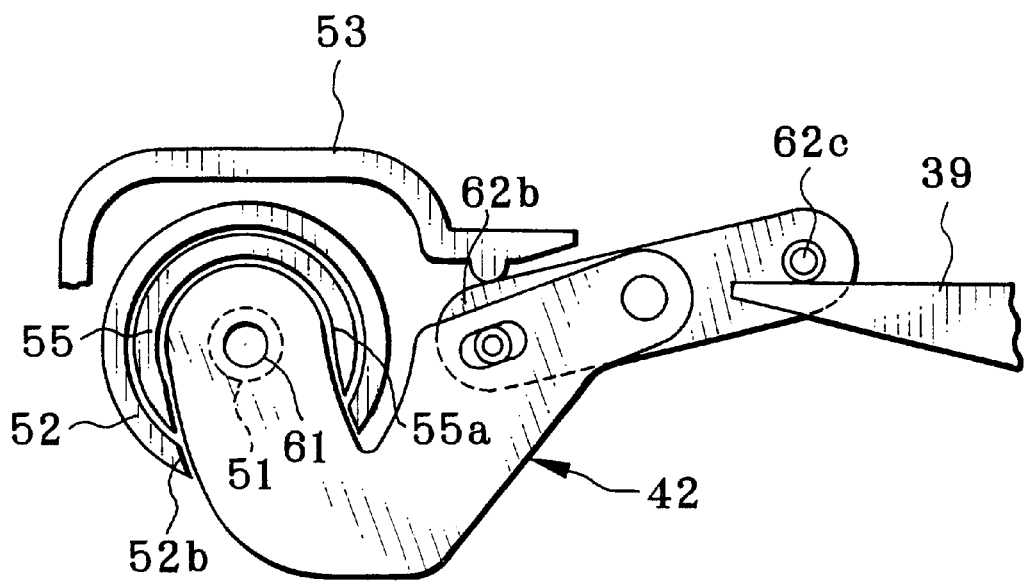
FIG. 5A is a schematic illustration partially showing a stop changing device in a state that a subject is bright.

Successively, an operation of the present embodiment is described below. When the lens-fitted photo film unit 2 is not used, the flash switch 8 is slid downward to the OFF-position. Thus, the charging switch 35 provided on the printed circuit board 30 is set to the OFF-state. At this time, as shown in FIG. 5A, the stop plate 42 enters the concave 55a of the lens base 41 through the cut portion 52a by means of the spring 63 so that the stop aperture 61 is positioned at the photographic optical axis. When the lens-fitted photo film unit 2 is used to take a picture, a photographer estimates the subject brightness and judges whether the flash light is necessary or not for taking the picture.

When the subject brightness is high and the flash light is judged to be unnecessary, the lens-fitted photo film unit 2 is set to a subject without operating the flash switch 8. Then, the release button 11 is depressed after framing. Upon depressing the released button 11, the shutter mechanism kept in the charge state is released so that the shutter lever 46 kicks the shutter blade 36. The kicked shutter blade 36 is swung against the spring 45 in the clockwise direction to fully open the shutter opening 47 for a prescribed period.

In the meantime, when the subject brightness is low and the flash light is judged to be necessary, the photographer slides the flash switch 8 upward to the ON-position. Upon this, the switch member 38 integrally formed with the flash switch 8 is also moved upward to turn on the charging switch 35 of the circuit board 30. Thus, the flash circuit is turned on to charge the main capacitor 31. When the main capacitor 31 has been completely charged, a neon tube connected to the circuit board 30 emits the light. The light emitted from the neon tube is reflected inside the light guide 13 to notify the photographer that the preparation for photographing is completed. The light guide 13 projects from the front cover 20 in association with the switch member 38 so that the preparation for photographing is easily confirmed.

Figure 5B:
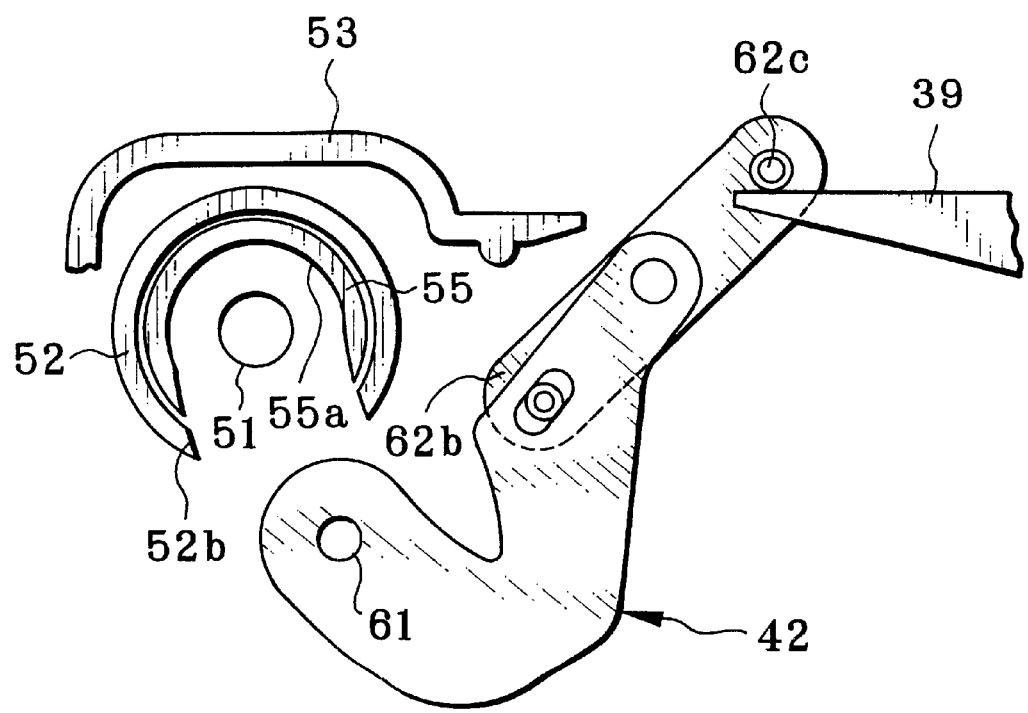
FIG. 5B is a schematic illustration partially showing the stop changing device in a state that a subject is dark.

When the flash switch 8 is slid toward the ON-position, the setting segment 39 of the switch member 38 pushes up the abutting pin 62c to rotate the stop plate 42 against the spring 63, such as shown in FIG. 5B. Owing to this, the end portion of the stop plate 42 moves to the outside of the lens-holding rib 52 through the cut portion 52a so that the stop aperture 61 is evacuated from the photographic optical axis. Upon depressing the release button 11, the shutter blade 36 is rotated in the open direction to fully open the shutter opening 47 for the prescribed period. At this time, the press segment 36c of the shutter blade 36 short-circuits the synchro switch 33 to emit the flash light from the flash portion 7 toward the subject. Since the used flash unit 17 has the low guide number, an amount of the flash light is smaller in comparison with the conventional lens-fitted photo film unit. However, the photographic film 24 of ISO 1600 is used so that it is possible for this photographic film 24 to obtain a sufficient exposure amount. In this way, the stop is surely changed in accordance with the subject brightness so that the photographic film 24 is properly exposed.

In the present embodiment, the taking lens 5 having the single-lens structure is used. When a taking lens having a two-lens structure is incorporated by utilizing parts of the lens-fitted photo film unit 2, a second lens which is different from the taking lens 5 may be held at a film side of the lens base 41 so as to be disposed behind the stop plate 42.

In the above embodiment, the stop changing device moves the stop plate 42 in association with the manual operation of the flash switch 8. The stop changing device keeps the stop plate in the smaller-stop position at the time of normal photographing, and moves the stop plate to the larger-stop position at the time of flash photographing. The present invention, however, is not exclusive to this. For example, the stop changing device may control a solenoid in accordance with the subject brightness, such as described in Japanese Patent Application No. 2000-395475. In this case, the stop plate is moved between the smaller-stop position and the larger-stop position by means of a spring. Alternatively, a stop changing switch may be independently provided. This stop changing switch is externally operated to select one of the smaller-stop position and the larger-stop position. The stop plate is associated with the manual operation of this switch.

In the above embodiment, the stop is changed by inserting the stop plate formed with the stop aperture, which is smaller than the aperture-stop. However, this is not exclusive. The stop plate may be provided with two apertures of a larger-stop aperture and a smaller-stop aperture. One of the two stop apertures is positioned at the photographic optical axis to change the stop.

In the above embodiment, the photographic film 24 of ISO 1600 is used. However, it is possible to use a photographic film having higher sensitivity of ISO 3200. Further, the cartridge of 135-type is not exclusive. For instance, a cartridge of IX240-type may be used.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit loaded with an unexposed photographic film in advance, comprising:
    a single taking lens for forming an image on said photographic film;
    a stop plate disposed at an image-forming side of said taking lens and moving in a perpendicular direction to an optical axis of said taking lens;
    a stop aperture of a small size formed in said stop plate;
    a stop changing mechanism for moving said stop plate between a smaller-stop position where said stop aperture is positioned at said optical axis, and a larger-stop position where said stop aperture is evacuated from said optical axis;
    a lens base for supporting the image-forming side of said taking lens, said lens base being formed with a fixed stop aperture of a large size; and
    a concave formed in said lens base, a part of the stop plate entering said concave when said stop plate is set to the smaller-stop position, and said stop plate being evacuated from said concave when said stop plate is set to the larger-stop position.

2. A lens-fitted photo film unit according to claim 1, wherein said photographic film has ISO sensitivity of 1600 or more.

3. A lens-fitted photo film unit according to claim 1, wherein said stop plate has an L-figure shape and an end portion thereof is formed with said stop aperture.

4. A lens-fitted photo film unit according to claim 3, wherein said concave of said lens base has a shape corresponding to a contour of said end portion of the stop plate.

5. A lens-fitted photo film unit according to claim 4, wherein the contour of said end portion has an arc shape.

6. A lens-fitted photo film unit according to claim 5, wherein said lens base includes:
    a lens-receiving rib for supporting the image-forming side of said taking lens, said lens-receiving rib having a circular shape; and
    a first cutout formed in said lens-receiving rib and through which said end portion of the stop plate passes, said concave being formed by said first cutout and said lens-receiving rib.

7. A lens-fitted photo film unit according to claim 6, wherein said lens-receiving rib has a horseshoe shape.

8. A lens-fitted photo film unit according to claim 7, wherein said lens base is formed with a lens-holding rib for containing said taking lens, said lens-holding rib being formed outside said lens-receiving rib and having a second cutout through which said end portion of the stop plate passes.

9. A lens-fitted photo film unit according to claim 8, wherein said stop changing mechanism comprises:
    a stop lever securely fixed to said stop plate, said stop lever being rotatably attached to said lens base;
    a setting segment for rotating said stop lever, said setting segment rotating said stop lever when said stop plate is moved toward the larger-stop position; and
    a spring for urging said stop plate toward the smaller-stop position.

10. A lens-fitted photo film unit according to claim 9, wherein said stop lever includes:
    an attachment portion to which said stop plate is attached;
    a shaft member formed on said attachment portion, said shaft member being rotatably attached to said lens base; and
    an abutting pin formed on said attachment portion and for abutting on said setting segment, said stop lever being rotated against said spring when said abutting pin is pushed by said setting segment.

11. A lens-fitted photo film unit according to claim 10, wherein said shaft member is rotatably attached to a projection formed on said lens base.

12. A lens-fitted photo film unit according to claim 11, wherein said setting segment is integrally formed with a switch member, which is externally operable.

13. A lens-fitted photo film unit according to claim 12, wherein said switch member is operated for selecting whether flash photographing is performed or not.

14. A lens-fitted photo film unit according to claim 13, wherein said stop plate is set to the smaller-stop position when the flash photographing is not performed, and said stop plate is set to the larger-stop position when the flash photographing is performed.

15. A lens-fitted photo film unit according to claim 14, wherein said switch member is disposed at a front side of said lens-fitted photo film unit.

* * * * *